(12) United States Patent
Schneider et al.

(10) Patent No.: US 9,410,748 B2
(45) Date of Patent: Aug. 9, 2016

(54) HIGH-TEMPERATURE HEAT STORE FOR SOLAR-THERMAL POWER PLANTS

(75) Inventors: Günter Schneider, Bietigheim-Bissingen (DE); Hartmut Maier, Stuttgart-Botnang (DE); Martin Stenglein, Bietigheim-Bissingen (DE)

(73) Assignee: enolcon GmbH, Bietigheim-Bissingen (DE)

( * ) Notice: Subject to any disclaimer, the term of this patent is extended or adjusted under 35 U.S.C. 154(b) by 533 days.

(21) Appl. No.: 13/813,952

(22) PCT Filed: Aug. 4, 2011

(86) PCT No.: PCT/EP2011/063453
§ 371 (c)(1),
(2), (4) Date: Feb. 3, 2013

(87) PCT Pub. No.: WO2012/017041
PCT Pub. Date: Feb. 9, 2012

(65) Prior Publication Data
US 2013/0126122 A1    May 23, 2013

(30) Foreign Application Priority Data

Aug. 6, 2010 (DE) .......................... 10 2010 033 571
Dec. 23, 2010 (DE) .......................... 10 2010 055 997

(51) Int. Cl.
*F28D 17/04* (2006.01)
*F28D 20/00* (2006.01)
*F28F 27/02* (2006.01)
*F28D 20/02* (2006.01)
*F28D 17/00* (2006.01)

(52) U.S. Cl.
CPC ................ *F28D 17/04* (2013.01); *F28D 17/00* (2013.01); *F28D 20/0056* (2013.01); *F28D 20/023* (2013.01); *F28D 20/028* (2013.01); *F28F 27/02* (2013.01); *F28D 2020/0069* (2013.01); *F28D 2020/0078* (2013.01); *Y02E 10/46* (2013.01); *Y02E 60/142* (2013.01); *Y02E 60/145* (2013.01); *Y02E 70/30* (2013.01)

(58) Field of Classification Search
CPC .......... F28D 17/005; F28D 2020/0021; F28D 20/0056; F28D 2020/0069; F28D 17/04; F28D 2020/0078; F28C 3/12; F24J 2/34
USPC ........................................................... 165/10
See application file for complete search history.

(56) References Cited

U.S. PATENT DOCUMENTS

| 2,856,506 | A | | 10/1958 | Telkes | |
|---|---|---|---|---|---|
| 2,933,885 | A | * | 4/1960 | Vago | F01K 3/00 122/35 |
| 4,137,898 | A | * | 2/1979 | Koizumi | F24D 11/007 126/400 |
| 4,194,496 | A | | 3/1980 | Carlson | |
| 4,222,365 | A | * | 9/1980 | Thomson | F01K 3/00 126/400 |
| 4,262,735 | A | | 4/1981 | Courrege et al. | |

(Continued)

FOREIGN PATENT DOCUMENTS

| DE | 1 939 534 | 2/1971 |
|---|---|---|
| DE | 24 44 217 | 4/1976 |

(Continued)

*Primary Examiner* — Devon Russell
(74) *Attorney, Agent, or Firm* — Gudrun E. Huckett (57) ABSTRACT

Proposed is a cheap and durable high-temperature heat store which utilizes ambient air as a heat carrier medium and which is at least partially filled with a granular and/or porous storage medium (6).

30 Claims, 6 Drawing Sheets

(56) References Cited

U.S. PATENT DOCUMENTS

| | | | |
|---|---|---|---|
| 4,286,141 A | 8/1981 | MacCracken | |
| 4,304,219 A * | 12/1981 | Currie | F24D 19/109 126/587 |
| 4,418,683 A * | 12/1983 | Friefeld | F24D 11/00 126/400 |
| 4,463,799 A * | 8/1984 | Takahashi | C09K 5/06 165/10 |
| 4,703,749 A * | 11/1987 | Morse | F22B 1/028 126/400 |
| 7,954,321 B2 * | 6/2011 | Shinnar | F03G 6/04 165/902 |
| 8,544,275 B2 * | 10/2013 | Shinnar | F01K 3/00 126/617 |
| 9,016,358 B2 * | 4/2015 | Fieback | C08J 9/0009 165/10 |
| 2008/0066736 A1 * | 3/2008 | Zhu | F03G 6/005 126/620 |
| 2010/0089391 A1 * | 4/2010 | Addie | F24J 2/34 126/617 |

FOREIGN PATENT DOCUMENTS

| | | | |
|---|---|---|---|
| DE | 27 31 115 | 1/1979 | |
| DE | 100 05 937 A1 | 8/2001 | |
| DE | 10005937 A1 * | 8/2001 | F28D 20/0056 |
| DE | 101 49 806 A1 | 4/2003 | |
| DE | 103 29 623 B3 | 1/2005 | |
| DE | 10 2004 049 098 A1 | 6/2006 | |
| EP | 44998 A * | 7/1981 | |
| EP | 0 044 998 A1 | 2/1998 | |
| GB | WO 2010116162 A2 * | 10/2010 | F24J 2/07 |
| JP | S30-003776 | 3/1955 | |
| JP | S54-005254 | 1/1979 | |
| JP | H04-272458 | 9/1992 | |
| JP | H09-061077 | 3/1997 | |
| JP | 2703764 A2 * | 3/2014 | F28D 20/02 |
| WO | 2008/109746 A2 | 9/2008 | |
| WO | 2009/103106 A2 | 8/2009 | |
| WO | 2010/060524 A1 | 6/2010 | |

* cited by examiner

HIGH-TEMPERATURE HEAT STORE FOR SOLAR-THERMAL POWER PLANTS

BACKGROUND OF THE INVENTION

The invention concerns a store and a method for large-scale storage of thermal energy in the form of high-temperature heat at a temperature level of at least 280° C.

Solar thermal power plants can produce electricity, heat or steam without a store only at times of high direct solar radiation. The higher the temperature of the heat that is provided by an array of concentrating solar collectors (in the following referred to as a solar field), the higher the efficiency of the connected power plants. In a seawater desalination plant there is also the need for solar-produced heat at high temperature.

In general, the solar thermal steam generator or the solar field are oversized so that already in the morning, a short time after sunrise, the appropriate steam quantities for generating electricity or for seawater desalination can be produced. Around noon, usually too much steam is produced so that mirror surfaces of the solar field are either folded away or the excess heat is thermally stored.

The heat storage can be realized either in short term stores which in general are embodied as steam stores, so-called Ruths stores, or in salt stores in which a liquid salt solution absorbs the heat to be stored. After sundown, the heat that is stored in the short term store is then released by means of a heat exchanger to the water/steam circulation of the steam power plant, a thermal oil circulation or a seawater desalination plant.

Up to now, there was no demand for large-scale heat stores at high-temperature level because the central application in a solar thermal power plant has been lacking in recent times, with few exceptions. In the meantime the number of solar thermal power plants under construction and going into operation, and thus the demand for reliable and inexpensive thermal stores with a great storage capacity increases worldwide more and more.

In case of concrete stores the bad heat transfer between concrete and the pipelines in which the heat carrier is circulated is a basic disadvantage.

PCM stores ("phase change material" stores) in principle represent very interesting storage systems. For high-temperature applications above 200° C., there are however only small pilot plants within the kilowatt range. In this connection, the heat release and absorption when changing the phase from liquid to solid and vice versa at the same temperature is used. The energy density is presumably higher than in concrete stores or salt stores. A disadvantage are the expected high costs for PCM stores as well as for the required metal pipes and surfaces for the heat transfer. A great problem is also charging and discharging of the store within acceptable time periods. Moreover, hysteresis effects have been observed in the small pilot stores that make the store less efficient and reduce the utilizable storage capacity. It is also still unclear to what extent PCM materials will survive unimpaired with respect to their efficiency the high numbers of charging and discharging cycles.

At the moment, appropriate salts for PCM stores are provided such as $NaNO_2$, $NaNO_3$, or $KNO_3$. It is still unclear which materials can be used at higher temperatures above approximately 340° C. Celsius and at what costs. A disadvantage of PCM stores is the fixation to certain temperature levels, depending on which material is being used.

A great cost disadvantage of PCM stores, as in the case of a concrete store, are the numerous long and expensive high-pressure steam conduits that must be laid to the PCM store and must be extended through the PCM.

In the publication DT 24 44 217 dated Apr. 1, 1976, for example, it is discussed how sand or gravel can be used as a heat store when an appropriate conducting system is passed through the heat energy storage medium and which features the latter must fulfill. In large-scale practice, several thousand cubic meters of a storage medium sand or gravel are required for absorbing appropriate heat quantities. The proposed system of DT 24 44 217 is not realizable in practice for a large-scale application because, on the one hand, the costs of the pipeline system are too high and, on the other hand, as a result of the bad heat transfer between the pipeline system and the storage medium as well as within the storage medium, charging and discharging times are too long. Even for an optimized pipeline arrangement as disclosed in DT 24 44 217, the charging and discharging times are still too long. This system therefore is expected to have significantly worse operating properties in comparison to the above described concrete stores.

In the publication DE 27 31 115 dated Jan. 25, 1979, a system is described that uses a packed bed of granular solid particles and names natural magnesite or olivine as a storage material. This system is directed to smaller applications and has as a decisive feature that the charge flow circulates in a closed circuit. The heat in this system is not introduced by a heat exchanger but by electrical heating rods. This system is therefore not utilizable for large-scale applications with required storage capacities of much more than 20 MWh. If it were attempted to use this system in a large-scale variant, the problem is encountered that the charge flow over time will have an ever increasing temperature and the pressure in the closed charge circuit will increase. This requires a pressure-resistant design of the system and at the same time entails high costs. This effect of the temperature and pressure increase has also negative effects on the blower that circulates the charge flow. Moreover, charging of a thermal store for a solar thermal power plant by the detour of generating electricity and producing heat by means of heating rods is not sensible due to the efficiency loss for producing electricity.

U.S. Pat. No. 4,222,365 A discloses a heat store in which as a storage medium gravel or crushed rock, inter alia of granite or marble, is used.

The storage material is arranged together with a blower, a heat exchanger 48, and an air passage 56 within a housing 46. The heat exchanger 48 is flowed through by liquid alkali metal and releases heat therein to the air that is circulating in closed circulation within the housing. The air that is heated in this way flows through a bed of crushed rock which is heated thereby. Upon discharge of the store the flow direction of the air is reversed and the heat is from the crushed rock to the air and to the heat carrier that is flowing through the heat exchanger.

WO 2010/060524 discloses a heat store in which as a storage medium several solid bodies are used through which parallel passages extend. At the center of the heat store a heat exchanger is provided. By means of air that is circulating in a closed circuit within the heat store, the storage medium is charged and discharged.

A disadvantage of this system is the large outer dimensions of the housing as a result of the concept because within the housing, in addition to the actual storage medium, air passages, a blower and a heat exchanger must be arranged also. This increases the costs and reduces the efficiency of the store.

Moreover, the system disclosed in U.S. Pat. No. 4,222,365 A requires for discharging two heat exchangers (a first heat exchanger within the housing and a second heat exchanger in a steam generator in order to be able to use the stored heat in a steam turbine for producing electricity.

In principle, in the literature or in patent documents there is nothing to be found that meets the posed requirements with respect to high storage capacity at high temperatures with quick charging and discharging times and high cycle numbers. Modifications of related applications also doe not result in an acceptable solution.

In connection with the claimed invention, the following terminology is employed:

A high-temperature heat store is to be understood as one or several storage modules inclusive the corresponding peripheral devices (heat exchanger, blower, conduits, flaps etc.).

A storage module comprises a gas-tight housing having in its interior one or several storage media. These storage media can be charged or discharged via feed line(s) and discharge line(s). Since the storage modules according to the invention can be produced and sold independent of the peripheral devices, the instant application also claims the storage modules according to the invention as such.

The object of the invention is therefore to provide a storage system which comprises the actual high-temperature heat store and the correlated peripheral devices, that can be used at high temperatures and across wide temperature ranges, and in which the heat can be quickly introduced and also discharged again for several years with many charging and discharging cycles. At the same time, the storage system should require low investment and operating costs.

SUMMARY OF THE INVENTION

The object is solved in that the heat generated by a solar field and transferred onto a heat carrier, for example, steam, a liquid salt melt, a thermal oil or another liquid medium, is transferred by a commercially available heat exchanger to ambient air and the resulting hot air is guided by means of a feed line into the storage module according to the invention. The storage module according to the invention is filled with a porous and/or granular storage material, for example, sand, gravel, stone, corundum and/or graphite. These porous and/or granular storage material absorbs very quickly the heat from the air passing through and with minimal temperature difference (temperature differential). The air is moved at ambient pressure or slight overpressures so that neither the air passages nor the storage module itself must be designed for higher pressures above 2-3 bar (absolute). Moreover, the blower (fan or ventilator) employed for conveying the air through the high-temperature heat store according to the invention must convey only cold ambient air so that commercially available and inexpensive components can be used. This lowers the costs and increases availability significantly.

Finally, also the demand for electrical drive power for the blower is reduced because the volume of the cold ambient air is very much smaller than that of heated air. Accordingly, the operating costs are further reduced and the efficiency of the system is increased.

Removal of the heat (discharge) is realized in analogy, i.e., cold air, preferably ambient air, is passed through the storage medium and absorbs in this way the heat that is contained in the storage module. The hot air is then guided via suitable passages to a heat exchanger that transfers the heat again to a salt melt, thermal oil or another medium or preferably water or steam.

The advantage of this system in comparison to other heat storage systems resides in that by using sand, gravel, stone or corundum and optionally also graphite, very inexpensive heat storage materials that are obtainable anywhere can be used. These materials have a great charge and discharge cycle resistance across wide temperature ranges and can be used continuously in any temperature ranges of technical interest. The heat is transported via air as a medium that is easily transportable by blowers to the heat storage material at minimal pressures, the heat transfer between air and the heat storage material is excellent as a result of the flow about the storage material.

In an advantageous embodiment, only cold air with temperatures below 50-60° C. is passed through the blower which is very advantageous for the blower power and the energy consumption of the system.

A further possible advantageous embodiment proposes recovery of the residual heat of the exhaust gas stream. This means that the exhaust gas stream transfers by a recuperative or regenerative air/air heat exchanger the existing residual heat to the cold air stream downstream of the blower. The heat recovery system according to the invention enables an extended discharge operation and increases the efficiency of the total system. Technically, such an air/air heat exchanger can be easily controlled.

In an operatively optimized embodiment, a portion of the air stream can also be circulated. This can be realized either in the context of the entire system, but also only by the heat exchanger. The air passages of the system can be manufactured inexpensively of standard components and materials.

As heat exchangers, commercially available large heat exchanger systems (for example, steam/air heat exchangers) or other modified commercially available waste heat recovery boiler systems can be used. By the optional utilization of an auxiliary burner or an auxiliary firing with conventional fuels such as natural gas or oil, the charging and primarily the discharging process can be optimized and operationally stabilized.

In principle, with this method or system no special and expensive materials or apparatus must be used. In this way, also large-scale heat storage systems can be realized at low costs.

With appropriate optimization possibilities, for example, in connection with layering the storage medium or varying the average diameters of the grain size of the employed storage material, this system can also be maintained within acceptable dimensions with regard to size and storage density in accordance with the required volume and required surfaces.

A further application of this method or system is the direct feed of heated hot air, for example, of solar powerplants, for example, tower power plants, or the exhaust air of hot air turbines or hot exhaust gases of gas turbines into the air passage (second feed line) of the system downstream of the blower that is arranged in the second feed line.

In this context, in a simple way and without impairing the blower, the corresponding heat can be introduced into the storage system. Depending on which parameters with respect to temperature and pressures are adjusted, the blower can be controlled accordingly and conveys thereby an appropriate air stream from the environment that is then mixed with the fed-in streams. In this connection, it is even conceivable that the blower is not required, for example, when the exhaust gas temperature of a gas turbine is high enough and an appropriately high exhaust gas pressure is existing that is sufficient for overcoming the pressure loss through the storage system.

In principle, by means of this system the heat of warm or hot exhaust gas streams can still be sensibly stored or utilized even in the industrial field.

To what extent in these application situations an air/air heat exchanger for recovery of the residual heat, as disclosed in the preceding section, can contribute to optimization and where it is then installed depends on the respective parameters.

Compliance with appropriate rules and regulations with respect to emissions is not a problem with this method or system when utilizing exhaust gases of combustion processes, for example, of an auxiliary firing or when utilizing gas turbine exhaust gases.

Depending on the application situation and requirements with regard to air temperature, the storage material with regard to material and/or layer configuration can be also optimized. This optimization, for example, can provide that as a layer of the storage material, instead of sand, gravel, corundum or graphite, closed spheres are used which are filled with a phase change material (PCM). In such an embodiment, the advantages of the heat store according to the invention (for example, high inlet temperatures when charging, beneficial heat transfer, and utilization of cost-efficient materials) can be combined with the advantages of PCM for such an application (namely a largely stable temperature at the air outlet). The stable temperature at the air outlet provides advantages in many downstream processes (steam generator etc.) in regard to operating control and configuration of the components.

For realizing a high-temperature heat store according to the invention, it has been found to be advantageous to arranged the storage materials contained in the storage module or modules in the form of a storage surface that can be, for example, arranged like a partition between bottom and cover of the housing. The storage surface can also be arranged level or horizontal. In this way, several positive effects are achieved.

Firstly, by arranging the storage material in the form of one or several storage surfaces, it is ensured that the flow resistance for the heat carrier when passing through the storage surfaces is very low. This is so because, on the one hand, an inlet surface and an outlet surface of the at least one storage surface is very large compared to the flow cross-section in the feed line or the discharge line. Therefore, the heat carrier flows with very minimal speed through the at least one storage surface and only very minimal pressure losses are caused upon passage through the at least one storage surface.

A further important effect can be seen in that the storage surface in the flow direction of the heat carrier is relatively thin so that the heat carrier must travel only a short distance through the storage surface. This also leads to reduced pressure losses. However since the heat carrier, as already mentioned, flows at very low flow speed through the storage surface, a large proportion of the sensible heat that is stored in the heat carrier is transferred into the storage material and is thus stored in the store or storage module according to the invention.

It is also possible, of course, that the heat carrier on its path from the feed line to the discharge line flows several times through different storage walls. When the heat carrier sequentially flows through several storage surfaces that are, for example, arranged as a cascade, then the different storage surfaces have different temperatures so that the energy loss is minimized when upon discharge of the store the cold heat carrier flows in the opposite flow direction through the storage walls. Accordingly, the cold heat carrier is first heated by a storage wall whose temperature is only minimally greater than the temperature of the cold heat carrier. The heat carrier which is preheated in this way flows then through a second storage surface whose temperature is somewhat higher than that of the first storage surface and so on. In this way, it is possible, similar to a countercurrent heat exchanger, to carry out the heat transfer upon charging as well as discharging with an almost constant temperature difference between the storage material and the heat carrier; this minimizes energy losses upon charging and discharging the storage module according to the invention.

Since the storage module according to the invention is filled with a granular storage medium and this granular storage medium in general is free-flowing or pourable, it is in many cases required that at least the inlet surfaces and the outlet surface of the storage surfaces are delimited by a net, a lattice, a perforated metal plate, a nonwoven and/or another gas-permeable porous boundary surface. In this way, it is ensured that the storage material remains at the predetermined location. One can envision a storage wall according to the invention like a wire-mesh basket that is filled with stones or crushed rock or gravel.

Of course, attention must be paid in this context that the net, the lattice, the perforated metal plate and/or the nonwoven will cause only minimal flow resistance for the heat carrier in order to minimize the pressure losses upon passing through the storage surface.

It may be necessary to provide in the area of the inlet surface and/or the outlet surface a support structure. This support structure can be, for example, formed by several parallel extending metal rods that support, for example, a lattice or a perforated metal plate or a nonwoven that prevents the storage material located in the storage surfaces from falling out. In this connection, of course, attention must be paid that the support structure reduces the cross-sectional surface area of the storage surface as little as possible in order to maintain the aforementioned advantages of the low flow speed and minimal pressure loss.

An especially advantageous embodiment of the invention in this respect provides that the storage surface is embodied as a vertical wall and that within the storage surfaces several fins are provided that are arranged in vertical direction above each other. These fins can be, for example, made of sheet steel and serve to retain the storage material in its position. These fins can be, for example, designed as slantedly positioned sheet steel members. Because of the slantedly positioned fins the force of gravity forces the storage material into the center of the storage surface. A support structure at the inlet surfaces and at the outlet surfaces can therefore be omitted. Also, in many cases a net, a lattice, a perforated metal plate or a nonwoven at the inlet surfaces and at the outlet surfaces is not required. In this way, the flow resistance of the storage surface according to the invention is still further reduced and the manufacturing costs are also reduced.

In order to produce such a storage surface, it is sufficient to first build the fins in an appropriate support structure within the housing and subsequently to fill in the storage material into the space located between the fins. Because of the inwardly slanted arrangement of the fins, a storage wall is formed in this way.

In vertical section, this storage wall is configured like a plurality of vertically stacked conical heaps wherein the fins ensure that the different conical heaps have the same base surface so that a vertical storage wall with a constant wall thickness, in approximation, is provided.

A further advantageous embodiment of the invention provides that the at least one storage surface with the exception of the inlet surface and outlet surface are delimited by gas-tight walls. These gas-tight walls are required in order to ensure that the heat carrier is forced to flow through the storage surfaces and therefore short-circuiting between the feed line and the discharge line by means of bypassing at least one storage surface is prevented. Only then is it ensured that the entire storage material contained within the storage module according to the invention is indeed utilized for storage of sensible heat and, in this way, the efficiency and the performance capability of the inventive storage module are high.

As a storage material, sand, gravel, stones, corundum or graphite and/or also a so-called phase change material (PCM) can be used. As a suitable size for the individual grains of these granular-type, with the exception of the possibly employed PCM, materials, diameters of 2 mm to 80 mm have been proven successful. When PCMB are used, it must be housed in the store in suitable containers whose form and size are optimized with regard to heat transfer and thermal expansion.

Basically, it is applicable that the smaller the diameter the faster such a grain will be heated to the core. However, in this way the immediate spaces between the grains also become smaller and, as a result of this, the flow resistance increases. Accordingly, a suitable compromise must be found in accordance with the requirements of the individual situation.

It is also possible that the storage material within the storage wall is layered horizontally or vertically and, from layer to layer, the diameter of the employed storage material or the employed storage material itself is changed. Accordingly, the thermal properties of the storage material can be matched to the fluidic and thermal conditions present in the respective zone of the storage wall and, in this way, a further optimization of the performance capability of the storage module according to the invention can be achieved.

In order to prevent that the storage material over time will become "separated" because smaller grains of the storage material, following the force of gravity, will drop downward and larger particles remain at the top, it can be provided that within the storage surface a structure is provided that forms a space and is comprised of small tubes. Raschig rings, three-dimensional networks and/or other filler bodies. In this way, it is ensured that the storage material will not compact and become separated over time and, as a result of this, flow resistance through the storage surface in this area with compacted storage material will increase.

In order to be able to control charging and discharging of the storage module according to the invention, in the at least one feed line and/or the at least one discharge line a closure member, in particular a flap, is provided.

The at least one storage surface can be designed in the form of a cylindrical storage wall or a spiral shape. In this connection, it is particularly advantageous when several cylindrical storage walls are arranged concentrically to each other. In this way, with minimal size of the storage module a very high performance capability results and at the same time the heat transfer for charging and discharging is optimized.

Of course, depending on the modular geometry, the at least one storage layer can be embodied also as a cuboid, parallelepiped, cylinder, hollow cylinder and/or as a wall with spiral-shaped base surface.

In principle, it is possible to connect a feed lines and a discharge line for the heat carrier at any desired location of the housing. In this connection, attention is to be paid that the at least one feed line and the least one discharge line enable a uniform flow through the storage surfaces and, incidentally, also the pressure loss of the heat carrier upon flowing through the storage surface is minimized. Therefore, it is often expedient to provide the feed line laterally and the discharge line at the top of the housing of the storage module. Of course, the feed lines and discharge lines can however be connected also at any other location of the storage module.

In order to minimize temperature fluctuations for the housing upon charging and discharging, it has been found to be advantageous that the housing at its inner side is provided with a layer of storage material. In this way, this storage material participates in the heat storage. A further advantage of this layer of storage material that is covering the inner side of the housing can be seen in that the temperature fluctuations are dampened for the housing and, in this way, the thermal loads of the housing can be reduced.

It is understood, of course, that the housing, preferably at its outer side, is thermally insulated in order to minimize energy losses into the environment by radiation or convection. The storage module according to the invention can be connected in series or parallel with several similar or constructively identical storage modules. In this way, it is possible to provide a high-temperature store that, as needed, is combined of several storage modules. In this connection, the storage modules can be produced in an inexpensive way in standardized sizes. This modular construction simplifies also transport to the installation site.

A further advantage of this modular construction can be seen in that the individual storage modules, as needed, can be added subsequently or, in case of damage, can also be exchanged without the solar power plant having to be shut down.

As a storage material, sand or gravel or stone or corundum or graphite or similar materials (e.g. PCM) or combinations thereof are used.

The advantage of this store embodiment in comparison to other possible heat storage systems resides in that by using sand, gravel, stone or corundum, and optionally graphite or PCM materials, a very inexpensive heat storage material that is available anywhere can be used. The configuration according to the invention of the storage module and the storage surfaces enables charging and discharging of the store with minimal pressure losses.

The store can be constructed in various embodiments; it has been found to be advantageous however to configure the individual storage modules in the form of containers with standard dimensions. The latter can be accordingly transported easily and can be inexpensively produced. These modules can be arranged in a row next to each other or can be stacked on top of each other so that the total storage capacity can be enlarged accordingly in a simple way. Depending on the application, it may be expedient to use for this purpose standard container configurations as well as, for example, tank container configurations.

To these storage modules the appropriate air passages for the feed and discharge air are connected with air flaps. The storage modules can be constructively designed such that the air passage connectors are arranged above and below or laterally. This allows for great flexibility with regard to the required floor space.

In principle, with these stores no special materials or apparatus must be used because the store can also be operated with pressures below 1.5 bar (absolute). In this way, even large heat storage systems can be realized at low costs.

With appropriate optimization possibilities, for example, in respect to layering the storage medium or varying the average diameter of the grain size of the employed storage material within a module or from module to module, an optimal interconnection according to the requirements is made possible.

An operation at pressures higher than 1.5 bar is basically also possible but then significantly higher investment and operating costs are to be expected.

DESCRIPTION OF PREFERRED EMBODIMENTS

Figure 1A:
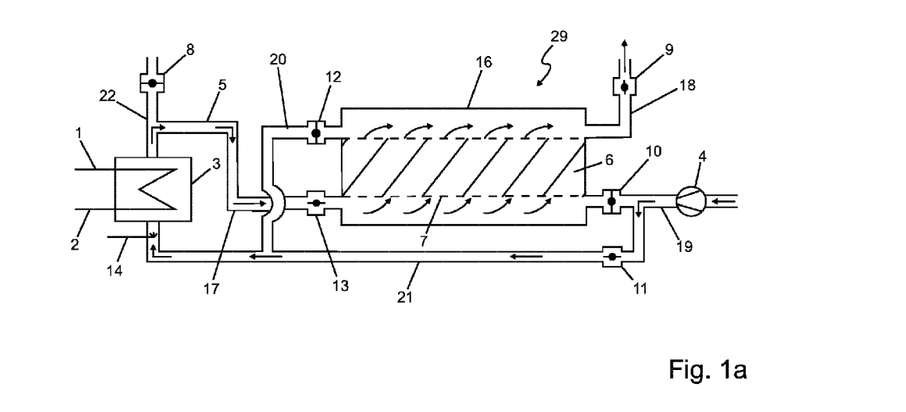
FIG. 1 shows charging of the heat storage system.

In FIG. 1a) a principal embodiment of the high-temperature heat store according to the invention and the operation upon charging is illustrated. Cold air from the environment is supplied by means of a blower 4 via an air passage, in the following also referred to as second feed line 19, a bypass line 21 and the flap 11 to a heat exchanger 3. Reference character 29 identifies a storage module. A flap 10 is closed during charging.

The excess heat from the solar field is supplied by the heat carrier medium of the solar field, e.g., steam or thermal oil, to the heat exchanger 3 by means of conduit 1.

Through the heat exchanger 3 the excess heat from the solar field is transferred to the air stream passing through. The cooled heat carrier medium of the solar field exits the heat exchanger 3 by means of conduit 2. The heated air is supplied via the air passage 5, a first feed line 17 and the air flap 13 to the storage module 29. The hot air is distributed within a housing 16 of the storage module 29 across a greater cross-section and flows e.g. through perforated metal plates 7 or lances through the heat exchanger material 6. The housing 16 can be made of metal, concrete, and/or another suitable material and, if required, is provided with a thermal insulation (not illustrated).

The heat storage material 6 can also be divided into several layers with different layer thicknesses, different storage materials and different average diameters of the storage material. In this context, the different layers can be separated from each other by means of high temperature-resistant air-permeable nonwovens or perforated metal plates or nets or porous ceramic structures in order to avoid mixing.

The hot air transfers the heat onto the heat storage material 6 and exits the storage module 29 through the first discharge line 18 and the open flap 9. During charging of the storage module 29 according to the invention, the flaps 8, 12 and 10 are closed.

Figure 1B:
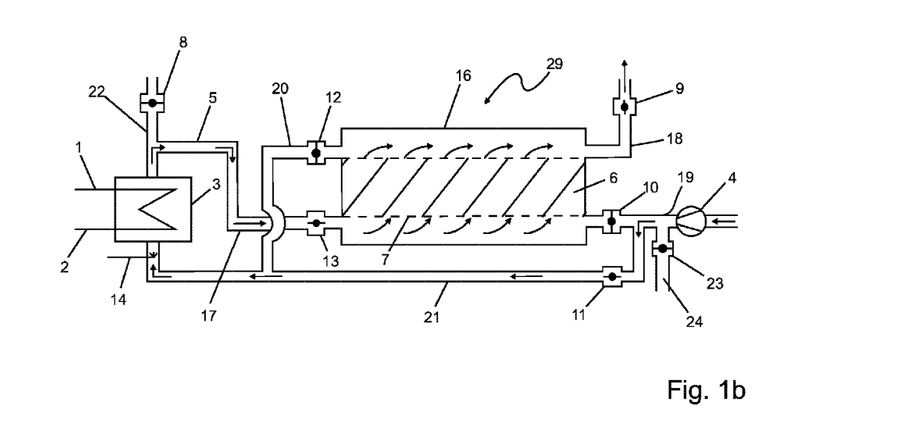

In FIG. 1b an alternative embodiment is illustrated that in addition to the components already described in connection with FIG. 1a has additionally a conduit 24 and a controllable flap 23 which is arranged in this conduit 24.

Through this line 24, if available, hot air or hot exhaust gases of an upstream process can be passed directly into the storage module 29 so that the sensible heat contained therein can be stored in the storage module 29 according to the invention without the "detour" through an air/air heat exchanger.

Since the conduit 24 opens downstream of the blower 4 into the second feed line 19, the blower 4 is not loaded with the high temperatures of the air or exhaust gases flowing through the conduit 24. The conduit 24 enables thus coupling of sensible heat of a gaseous medium (air or exhaust gases) at lower temperatures than in the heat exchanger 3.

Figure 2:
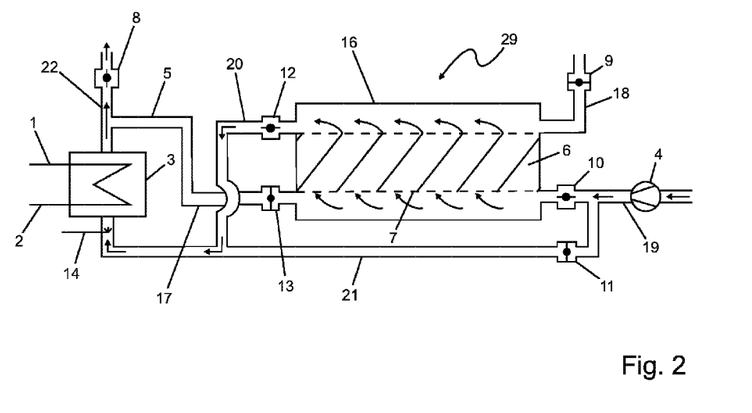
FIG. 2 shows discharging of the heat storage system.

FIG. 2 shows schematically discharging of the high-temperature heat storage system according to FIG. 1a) according to the invention. Discharging of the high-temperature heat exchanger system according to the invention according to FIG. 1b) is realized in the same way with closed flap 23 so that a separate description is not needed.

For discharging, by means of blower 4 cold air from the environment at a temperature of less than approximately 50° C. is sucked in and supplied through the second feed line 19 and the open flap 10 to the storage module 29. The flap 11 is closed during discharging.

By means of perforated metal plates 7 or lances, the cold air is distributed within the housing 16 and passed through the storage medium 6 where it absorbs the heat. The heated air exits then the store via the second discharge line 20 and the open flap 12 and is then passed through bypass line 21 to the heat exchanger 3 and heats therein the heat carrier flowing through the conduits 1 and 2.

The heat exchanger 3 can be configured like a heat recovery boiler downstream of gas turbines.

In the heat exchanger 3, the hot air transfers the heat to a downstream power plant process, not illustrated, with a water/steam circulation in that e.g. the the water is passed through conduit 2 into the heat exchanger 3 and exits as water vapor with appropriately high temperatures the heat exchanger 3 through conduit 1.

Upstream of the heat exchanger 3, an auxiliary firing 14 can be installed additionally that can serve, on the one hand, to further increase the temperature of the air and/or to keep the heat transfer in the heat exchanger stable. This embodiment with auxiliary firing 14 is particularly advantageous when the store is discharged to such a point that the temperature of the air has dropped to a level that a sensible operation of the downstream power plant process would not be possible anymore.

The detailed practical embodiment depends on a plurality of boundary parameters. For example, in large stores it may be expedient to divide the incoming flow for the storage material into several sections and to install individually controllable flaps 15 for making the flow therethrough more uniform. These control flaps 15 are adjusted such that the air stream and the pressure conditions are optimally distributed.

Figure 3:
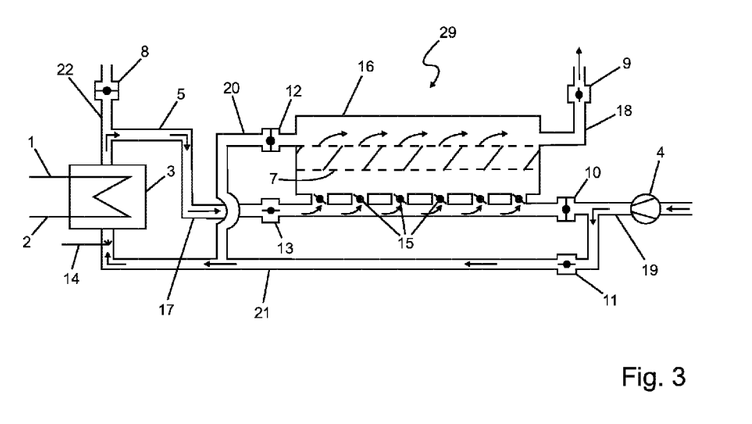
FIG. 3 shows charging of the heat storage system, embodiment with control flaps 15.

FIG. 3 shows a corresponding principal embodiment with control flaps 15 during charging of the store.

Also, such control flaps can be used expediently for discharging, for example, to discharge the store section-wise and to keep the air temperature level downstream of the store more stable at a high level for a longer period of time.

Figure 4:
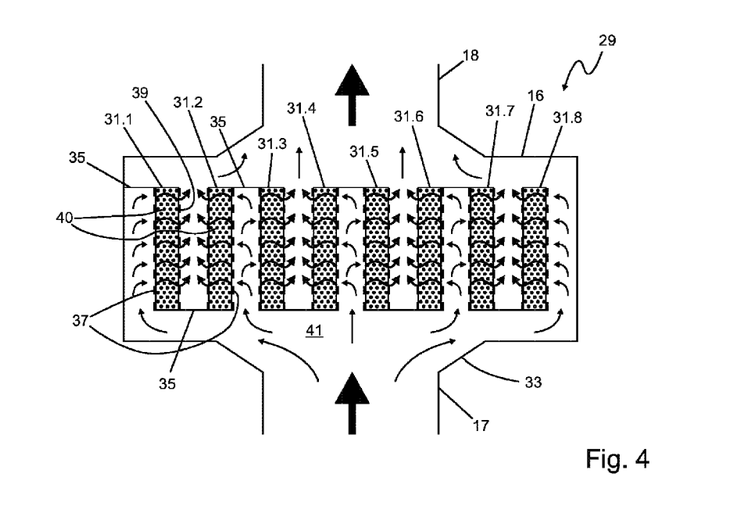
FIGS. 4 to 9 show embodiments of high-temperature heat stores.

FIG. 4 shows a plan view onto a first embodiment of a storage module 29 according to the invention. The storage module 29 is comprised of a housing 16 into which a feed line 17 opens. By means of feed line 17 a hot heat carrier, for example, air can pass into the interior of the housing 16. On the side of the storage module 29 opposite the feed line 17 a discharge line 18 is provided that serves for transporting away the heat carrier that has cooled down within the storage module 29.

In the housing 16, a total of eight vertical storage surfaces 31.1 to 31.8 are arranged. These storage surfaces 31 extend parallel to each other and are spaced apart from each other. They are comprised substantially of a storage material such as sand, gravel, crushed rock or the like.

The storage surfaces 31 in the illustrated embodiment are embodied as a vertical (storage) wall; they begin at the bottom 41 of the housing 16 and end at the cover of the housing 16. This cover is not illustrated in FIG. 4 in order enable a view of the interior of the storage module 29 according to the invention.

In order to uniformly distribute the hot heat carrier that is flowing through the feed line into the housing 16 across the entire width of the storage module 29, a diameter expansion 33 is provided which causes in the manner of a diffuser a deceleration of the heat carrier flowing in through the feed line 17. The path of the heat carrier through the storage module 29 is indicated by means of several arrows (without reference characters). This illustrates that the heat carrier forcibly flows through the storage walls 31.1 to 31.8 in order to flow from the feed line 17 to the discharge line 18.

In order to achieve this, the end faces of the storage walls 31 are closed by gas-tightwalls 35. A gas-tight wall 35 connects two neighboring storage layers 31 with each other, respectively. In the case of the storage surfaces 31.1 and 31.2, the storage surfaces are connected gas-tightly with each other at the end that is facing the feed line 17. In case of the storage walls 31.2 and 31.3, the ends of the storage surfaces facing the discharge line 18 are closed off by a gas-tight wall 35.

The storage wall 31.1 is connected at its end that is facing the discharge line 18 by means of a gas-tight wall 35 with the housing 16. In a similar way, at the other storage surfaces 31.3 to 31.8, gas-tight surfaces 35 are alternatingly arranged at the end faces. In this way, the hot heat carrier from the feed line 17 can flow only into every other intermediate space between two storage surfaces 31 or a storage surface 31.1, 31.8 and the housing 16.

Subsequently, the heat carrier flows through the storage surfaces 31 and then, arrived at the other side of the storage service, can flow out in the direction of discharge line 18. As can be seen already in the simplified illustration of FIG. 4, the total of eight storage surfaces 31.1 to 31.8 have several advantageous properties for charging and discharging the storage material.

The storage surfaces 31 form a very large inlet surface 37 and have, because it is a straight storage wall 31, an outlet surface 39 of the same size. In this way, it is ensured that the heat carrier can flow with very minimal speed and thus with minimal pressure loss through the storage walls 31.

Because of the minimal flow speed the residence time of the heat carrier in the storage surface 31 is relatively long so that an excellent heat transfer between the gaseous heat carrier and the storage material 40 in the storage surfaces 31 can take place.

Moreover, it is apparent when looking at FIG. 4 that because the thickness of the storage surfaces 31 is relatively minimal, the flow path of the heat carrier through the storage surfaces 31 is relatively short which also has a positive effect with respect to pressure loss of the heat carrier upon passing through the storage walls 31.

In FIG. 4, charging of the storage module 29 is illustrated. When the storage module according to the invention is to be discharged, this can be done, for example, in that the flow direction is reversed and through the discharge line 18 cold air is conveyed into the storage module 29. This cold air flows opposite to the flow direction for charging the storage module 29. When doing so, through the storage walls 31 absorbs largely the stored sensible heat and exits as hot heat carrier the housing 16 via the feed line 17. Of course, it is also possible and in many situations also advantageous when charging and discharging of the storage module is carried out through separate feed lines and discharge lines as is disclosed for example in connection with FIGS. 1 and 2. These additional feed and discharge lines are not illustrated in FIG. 4.

Figure 5:
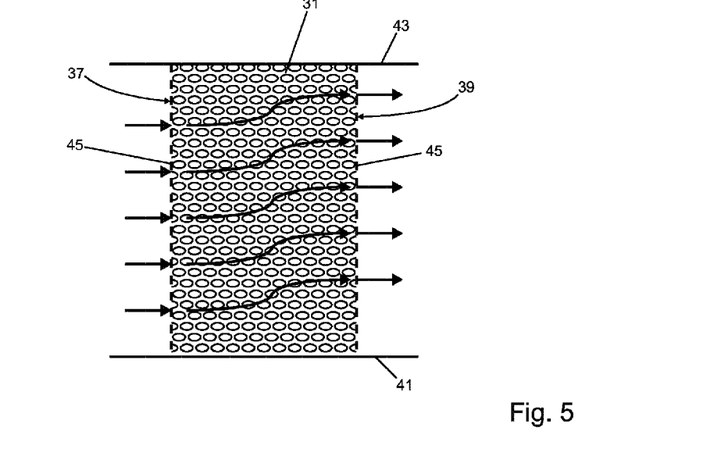

In FIG. 5, a first embodiment of a storage surface according to the invention is illustrated in detail and in vertical section.

The filter surface 31 is delimited at the lower end by bottom 41 and at the top by a cover 43 of the housing 16. In order for the storage material, which is illustrated in FIG. 5 as gravel, not to slide downwardly in accordance with the force of gravity, at the inlet surface 37 and at the outlet surface 39 a perforated metal plate or a lattice 45 is arranged. This perforated metal plate or lattice 45 must be matched with regard to its mesh size or size of the holes to the storage material in such a way that the storage material cannot pass through the holes or the lattice 45. At the same time, attention must be paid in this context that the flow resistance as a result of the lattice 45 or the perforated metal plate increases as little as possible. It is also conceivable to provide a stable lattice 45 with a large mesh size and to arranged between the storage material and this lattice 45 a nonwoven or a lattice with a much smaller mesh size (not illustrated).

Figure 6:
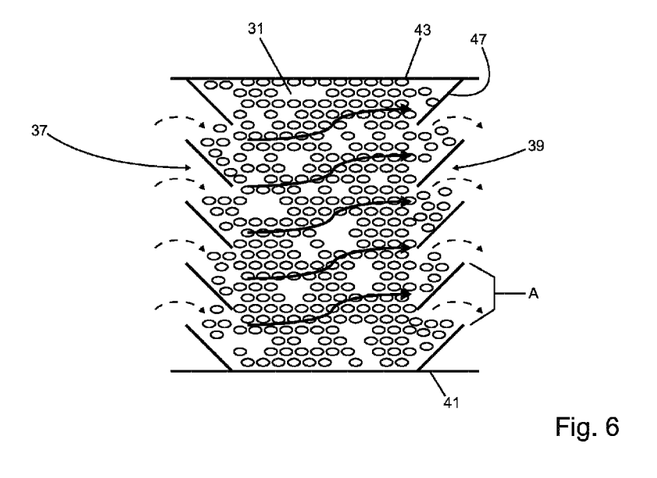

In FIG. 6, a further embodiment of a storage wall 31 according to the invention is illustrated. In this embodiment, a perforated metal plate or lattice 45 is not needed because at the inlet surface 37 and at the outlet surface 39 a plurality of fins 47 are arranged vertically above each other.

These fins 47 whose longitudinal axis extends perpendicularly to the plane of drawing are positioned at a slant in such a way that the storage material cannot fall out. The flow resistance of the heat carrier through such a storage wall 31 with the fins 47 is very low. Moreover, such a storage surface 31 can be produced simply on site in that a support structure (not illustrated) for the fins 47 is constructed in the housing 16. Subsequently, the intermediate space between the fins 47 is filled with the storage material. The slanted position of the fins 47 must be such that, on the one hand, no storage material falls out laterally from the storage wall. On the other hand, care must be taken that the spacing of the fins 47 in vertical direction does not become too large so that relative to the wall thickness the thickness of the storage wall 31 remains relatively constant. When the wall thickness as a result of the filling angle of the storage material decreases section-wise too much, the heat carrier, as indicated by the solid arrows in FIG. 6, then flows preferably through this thinner area of the storage wall and the other areas at the level of the fins 47 are flowed through only minimally.

The spacing A is moreover dependent on the fin length and the slant angle of the fins. An arrangement staggered relative to each other of the fins at the inflow side and the fins at the outflow side may be advantageous.

The vertical spacing A between two fins 47 is therefore an important parameter for the configuration of a storage surface 31 according to the invention.

Figure 7:
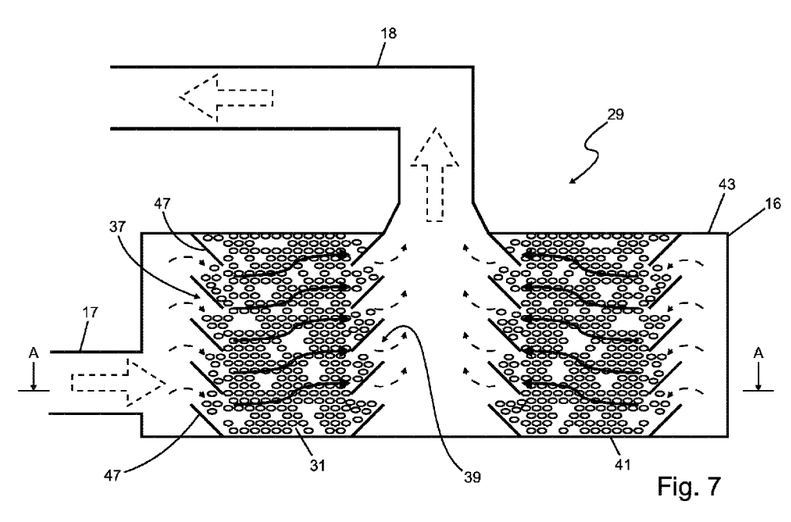
Figure 8:
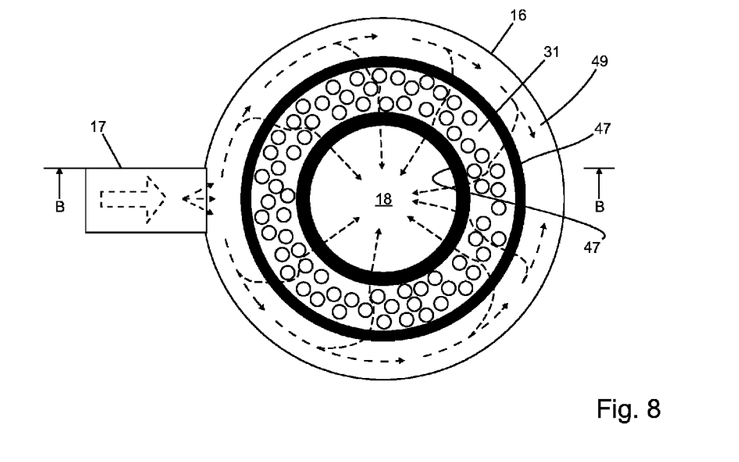

FIG. 7 shows a vertical section of an embodiment of a storage module 29 according to the invention whose housing 16 in plan view is cylindrical. The storage wall 31 is of circular ring shape and is limited in radial direction by the afore described fins 47. The storage wall 31, as can be seen in section along the line A-A of FIG. 8, is of circular ring shape. The fins 47 in this embodiment are also of a circular ring shape. By means of the feed line 17 the hot heat carrier flows into the ring space, delimited externally by the housing 16 and internally by the storage wall 31, into the storage module 29, flows radially inwardly through the storage wall 31, and exits the storage module 29 through the centrally arranged discharge line 18.

The section along the plane A-A in FIG. 8 shows that here also a very strong deceleration of the heat carrier flowing through the feed line takes place and therefore the heat carrier can flow through the storage wall 31 very slowly and with minimal pressure loss.

Moreover, a great advantage of the storage module according to the invention is to be seen in that the storage surfaces 31 in the end are comprised of an inexpensive bulk material that is secured by a simple and generally metallic structure. Accordingly, problems such as stress cracks that would be caused by regular heating and cooling of the storage layers is avoided. Also, it is possible without problems to exchange the storage material when its thermal properties as a result of aging decline or when the operating conditions have changed.

Figure 9:
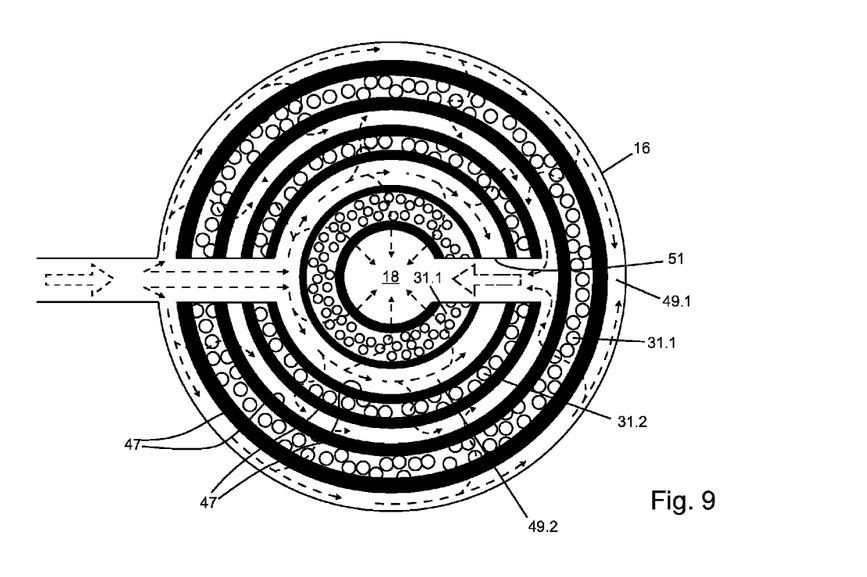

In FIG. 9, a section of a further embodiment of a storage module 29 according to the invention is illustrated in which three concentrically arranged filter walls 31.1, 31.2, 31.3 are present. Between the housing 16 and the outermost storage wall 31.1 the already described cylinder wall-shaped feed passage 49.1 is formed. Moreover, between the second filter wall 31.2 and the third filter wall 31.3 a further ring-shaped space 49.2 is formed that is connected with the feed line 17 and is therefore charged with hot heat carrier. From these two ring-shaped spaces 49.1 and 49.2 the hot heat carrier flows through the storage walls 31.1, 31.2 and 31.3 and flows into the centrally arranged discharge line 18. In order for the cooled heat carrier, which is located between the third ring-shaped space 49.3 between the first storage surface 31.1 and the second storage surface 31.2, to be discharged into the discharge line 18, a connecting passage 51 to the discharge line 18 is provided at the center of the housing 16.

Figure 10:
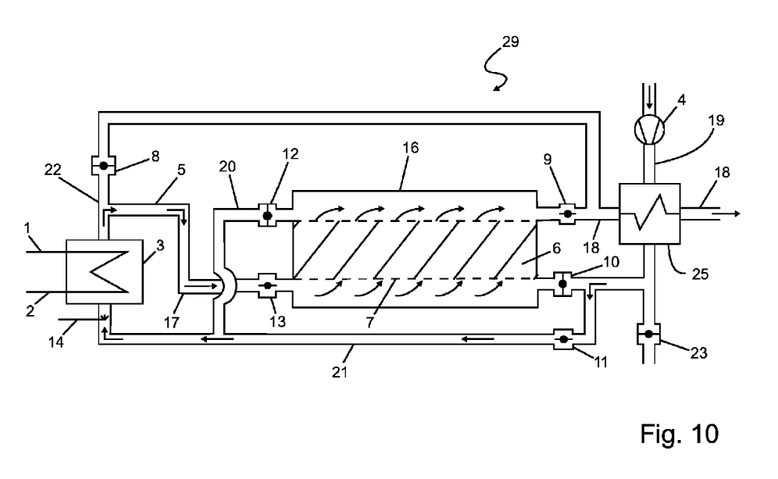
FIG. 10 shows a circuit diagram of a second embodiment of the heat storage system according to the invention.

In FIG. 10, a second embodiment of the high-temperature heat store according to the invention is schematically illustrated. It has great similarities with the embodiments illustrated with the aid of FIGS. 1 to 3 so that only the additional components will be explained here.

In the high-temperature heat store a regenerative or recuperative air/air heat exchanger 25 is present which upon charging of the high-temperature heat store transfers heat from the still warm exhaust air of the storage module 29 flowing in the first discharge line 18 onto the (still) cold ambient air that is flowing in the second feed line 19.

Accordingly, the heat losses caused by the exhaust air exiting from the storage module 29 through the first discharge line 18 are drastically reduced and, as a result of this, the storage efficiency and the performance capability of the high-temperature heat store according to the invention are improved.

When discharging the storage module 29, the flaps 8, 10 and 12 are opened and the flaps 9, 11 and 13 closed.

The flap 23 is controlled as explained in connection with FIG. 1b.

The ambient air that is sucked in by the blower 4 is heated by the air/air heat exchanger 25 in that the exhaust in the discharge line 18 transfers residual heat before exiting from the system.

The discharge stream can have temperatures of approximately 90° C. to 250° C., depending on the configuration and parameters.

A better part of the heat can be transferred by the air/air heat exchanger 25 to the incoming ambient air and therefore can be recovered. This heat remains in the system and the heat losses caused by the exhaust air that is exiting the storage module 29 through conduit 22 are drastically reduced.

The air/air heat exchanger 25 required for this can always be controlled at a good operating point because the air mass that is coming in via the second feed line 19 and the mass of the exhaust air flowing through the first discharge line 18 or the conduit 22 are identical in first approximation.

Accordingly, efficiencies and performance capability of the high-temperature heat store 29 for storing and discharging that are significantly above 90% can be achieved.

What is claimed is:
1. A high-temperature heat store comprising:
a storage module (29) comprising a housing (16);
at least one heat exchanger (3) arranged outside of the housing and comprising a hot side and a cold side;
at least one feed line connected to the housing;
a blower (4) arranged outside of the housing and adapted to supply ambient air to the housing through the at least one feed line;
at least one discharge line connected to the housing;
wherein the at least one feed line includes a first feed line (17) connecting the hot side of the heat exchanger (3) to the housing (16) and further includes a second feed line (19);
wherein the at least one discharge line includes a first discharge line (18) and further includes a second discharge line (20);
a bypass line (21) connecting the second feed line (19) to the cold side of the heat exchanger (3), wherein the second discharge line (20) is connected to the bypass line (21) upstream of the cold side of the heat exchanger (3);
controllable flaps (8-13) arranged in the first discharge line (18), the second discharge line (20), the first feed line (17), the second feed line (19), and the bypass line (21), wherein the controllable flaps control the air supplied by the blower (4) so as to charge the storage module with the air via a first flow path through the second feed line (19), the bypass line (21), the heat exchanger (3), and the first feed line (17) and so as to discharge the storage module (29) via a second flow path through the second feed line (19), the storage module (29), the second discharge line (20), the bypass line (21), and the heat exchanger (3).

2. The heat store according to claim 1, characterized in that the housing (16) is filled at least partially with a storage medium (6) selected from the group consisting of sand, gravel, stones, corundum, graphite, and combinations thereof, with average diameters of 2 to 80 mm.

3. The heat store according to claim 2, characterized in that air is introduced into the storage medium (6) by lances with slotted openings or hole openings.

4. The heat store according to claim 2, characterized in that the storage medium (6) is layered horizontally or vertically and each layer of the storage medium has a different average diameter of the storage medium; comprises different materials; or has a different diameter of the storage medium and comprises different materials.

5. The heat store according to claim 4, characterized in that the storage medium (6) is distributed onto several individual volumes and the individual volumes are arranged adjacent to each other or on top of each other or arranged in a cascade.

6. The heat store according to claim 5, characterized in that the storage medium (6) is retained by a retaining element in the form of a metallic net, perforated metal plate (7) and/or a nonwoven, wherein the air is passing through the retaining element to the storage medium (6).

7. The heat store according to claim 1, characterized in that the air is introduced through perforated or slotted flat metal plates into the storage medium.

8. The heat store according to claim 1, characterized in that only one heat exchanger (3) for storing and discharging heat in the heat store is used.

9. The heat store according to claim 1, characterized in that the at least one heat exchanger (3) is a heat recovery boiler of a gas turbine device.

10. The heat store according to claim 1, further comprising an auxiliary firing (14) for conventional fuels selected from the group consisting of oil or natural gas.

11. The heat store according to claim 1, having an operating temperature of at least 280° C.

12. The heat store according to claim 1, further comprising a second heat exchanger connected to the first discharge line (18) and to the second feed line (19) so that a first air stream exiting from the heat store after charging of the heat store passes through the second heat exchanger (25) and the second heat exchanger transfers residual heat contained in the first air stream to a second air stream that is flowing to the bypass line (21).

13. The heat store according to claim 12, characterized in that the third air stream leaving the heat store after discharging passes through the second heat exchanger and transfers residual heat to the second air stream that is flowing in the second feed line (19).

14. The heat store according to claim 1, characterized in that a storage section or a storage layer of the storage module (29) is filled with spheres that are filled with a phase change material (PCM).

15. The heat store according to claim 1, characterized in that the storage module (29) is filled with storage materials selected from the group consisting of zeolites, metal hydrides spheres, CaO, and $Ca(OH)_2$.

16. The heat store according to claim 1, characterized in that the storage module has storage layers that each have an inlet surface (37) and an outlet surface (39) and the storage layers (31) at the inlet surface (37) and/or the outlet surface (39) are delimited by a net, a lattice, a perforate metal plate, and/or a nonwoven.

17. The heat store according to claim 16, wherein the storage layers (31) are formed as vertical or horizontal walls, in the form of a cuboid, parallelepiped, cylinder, hollow cylinder or a wall with spiral-shaped base surface.

18. The heat store according to claim 16, wherein the storage layers (31), with the exception of the inlet surface (37) and the outlet surface (39), are delimited by gas-tight walls (35, 16, 41, 43).

19. The heat store according to claim 18, wherein the gas-tight walls (35, 16, 41, 43) prevent short-circuiting between the at least one feed line (17) and the at least one discharge line (18) as a result of bypassing the storage layers (31).

20. The heat store according to claim 1, characterized in that the storage module comprises storage layers that each comprise (31) in the area of the inlet surface (37) and the outlet surface (39) a support structure.

21. The heat store according to claim 20, characterized in that the storage layers (31) are enclosed or delimited by several fins (47) and the fins (47) in vertical direction are arranged on top of each other.

22. The heat store according to claim 21, characterized in that the fins (47) are slanted preferably in the area of the inlet surfaces (37) and the outlet surfaces (39) in vertical direction relative to a horizontal line.

23. The heat store according to claim 1, wherein the storage material is layered in storage layers horizontally or vertically and each one of the storage layers comprises a different average diameter of the storage material and/or a different storage material.

24. The heat store according to claim 23, wherein within the storage layers (31) a structure comprised of small tubes, Raschig rings, three dimensional networks or filler bodies is provided, in order to ensure that the storage material does not compact over time and the pressure loss through the storage material does not increase.

25. The heat store according to claim 1, characterized in that several cylindrical store walls (31.1, 31.2, 31.3) are arranged concentrically relative to each other.

26. The heat store according to claim 1, wherein the housing comprises a bottom and a cover and a housing wall connecting the bottom and the cover, wherein the at least one feed line (17) is a lateral feed line connected laterally to the housing wall of the housing or the at least one discharge line (18) is a lateral discharge line connected laterally to the housing wall of the housing, the lateral feed line supplying the air to the housing and the lateral discharge line discharging the air from the housing.

27. The heat store according to claim 1, wherein the housing (16) has a bottom (41) and a cover (43) and wherein the at least one feed line (17) or the at least one discharge line (18) for the air is connected to the bottom or the cover.

28. The heat store according to claim 1, wherein the housing (16) is thermally insulated.

29. The heat store according to claim 1, wherein the housing (16) is covered on the inner side with a layer of storage material.

30. The heat store according to claim 1, wherein the storage module comprises at least one storage layer (31) that is embodied as a cylindrical storage wall (31.1, 31.2, 31.3), as a spiral-shaped storage wall, as a cuboid or parallelepiped.

* * * * *